United States Patent
Sethi et al.

(10) Patent No.: US 12,160,329 B2
(45) Date of Patent: Dec. 3, 2024

(54) METHOD AND APPARATUS FOR WIRELESS COMMUNICATIONS

(71) Applicant: NXP USA, Inc., Austin, TX (US)

(72) Inventors: Ankit Sethi, Pune (IN); Sayak Roy, Kolkata (IN); Sudhir Srinivasa, Los Gatos, CA (US)

(73) Assignee: NXP USA, Inc., Austin, TX (US)

( * ) Notice: Subject to any disclaimer, the term of this patent is extended or adjusted under 35 U.S.C. 154(b) by 205 days.

(21) Appl. No.: 17/369,931

(22) Filed: Jul. 7, 2021

(65) Prior Publication Data
US 2022/0021559 A1 Jan. 20, 2022

(30) Foreign Application Priority Data
Jul. 15, 2020 (IN) .............................. 202021030033

(51) Int. Cl.
*H04L 25/02* (2006.01)
*H04B 7/0452* (2017.01)
*H04B 7/0456* (2017.01)
*H04W 4/06* (2009.01)
*H04L 5/00* (2006.01)

(52) U.S. Cl.
CPC ....... *H04L 25/0202* (2013.01); *H04B 7/0452* (2013.01); *H04B 7/0456* (2013.01); *H04W 4/06* (2013.01); *H04L 5/0007* (2013.01)

(58) Field of Classification Search
None
See application file for complete search history.

(56) References Cited

U.S. PATENT DOCUMENTS

| | | | |
|---|---|---|---|
| 9,392,098 B2 * | 7/2016 | Ryu | H04M 1/72412 |
| 9,668,258 B2 | 5/2017 | Kenney et al. | |
| 10,218,542 B1 | 2/2019 | Khairnar et al. | |
| 10,616,004 B1 | 4/2020 | Sethi et al. | |
| 10,785,772 B2 * | 9/2020 | Chun | H04L 1/1671 |
| 2016/0100408 A1 * | 4/2016 | Hedayat | H04L 5/0037 370/329 |
| 2016/0255610 A1 * | 9/2016 | Li | H04L 5/0053 370/329 |
| 2018/0014329 A1 * | 1/2018 | Lee | H04L 27/2603 |

(Continued)

OTHER PUBLICATIONS

IEEE P802.11ac™/D7.0 (Year: 2013).*

(Continued)

*Primary Examiner* — Jeffrey M Rutkowski
*Assistant Examiner* — Luna Weissberger

(57) ABSTRACT

Embodiments of a method and an apparatus for wireless communications are disclosed. In an embodiment, a method for wireless communications involves generating a packet for transmission to a user, where generating the packet includes: encoding user signaling parameters and setting a station-identification (STA-ID) of the user to a value, where the signaling parameters include a number of space time streams (nSTS) spatial streams, establishing a dummy user without changing the user signaling parameters, setting a STA-ID of the dummy user to a value that is different from the STA-ID value of the user, indicating the nSTS spatial streams that are allocated to the dummy user and that are to include Long Training Field (LTF) symbols, and transmitting the packet to the user with the LTF symbols.

21 Claims, 10 Drawing Sheets

(56) References Cited

U.S. PATENT DOCUMENTS

2019/0297622 A1* 9/2019 Noh .................. H04W 72/0446
2021/0007137 A1* 1/2021 Abouelseoud ........ H04L 1/0008

OTHER PUBLICATIONS

IEEE P802.11ac™/D7.0 Draft Standard for Information Technology—Telecommunications and information exchange (Year: 2013).*

IEEE, "IEEE P802.11ax™/D6.1", Draft Standard for Information technology—Telecommunications and information exchange between systems Local and metropolitan area networks Specific requirements, May 2020, 784 pgs.

IEEE, "IEEE P802.11ac™/D7.0", Draft Standard for Information Technology—Telecommunications and information exchange between systems Local and metropolitan area networks—Specific requirements, Sep. 2013, 456 pgs.

IEEE, "IEEE P802.11ax™/D8.0", Draft Standard for Information Technology—Telecommunications and information exchange between systems Local and metropolitan area networks—Specific requirements, Oct. 2020, 820 pgs.

* cited by examiner

| L-STF 202 | L-LTF 204 | L-SIG 206 | VHTSIGA1 208-1 | VHTSIGA2 208-2 | VHTSTF 210 | VHTLTF1 212-1 | DATA-1 214-1 | ... | DATA-N 214-N |

| L-STF 202 | L-LTF 204 | L-SIG 206 | VHTSIGA1 208-1 | VHTSIGA2 208-2 | VHTSTF 210 | VHTLTF1 212-1 | VHTLTF2 212-2 | VHTSIGB1 213 | DATA-1 214-1 | ... | DATA-N 214-N |

| COMPOSITE NAME: | BW 302 | RESERVED 304-1 | STBC 306 | GROUP ID 308 | NSTS/PARTIAL AID 310 | | | | TXOP_PS_NOT_ALLOWED 316 | RESERVED 304-2 |
|---|---|---|---|---|---|---|---|---|---|---|
| SU NAME: | | | | | SU NSTS 311 | PARTIAL AID 312 | | | | |
| MU NAME: | | | | | MU[0] NSTS 314-0 | MU[1] NSTS 314-1 | MU[2] NSTS 314-2 | MU[3] NSTS 314-3 | | |
| BITS: | 2 | 1 | 1 | 6 | 3 | 3 | 3 | 3 | 1 | 1 |
| | B0 B1 | B2 | B3 | B4 B9 | B10 B12 | B13 B15 | B16 B18 | B19 B21 | B22 | B23 |

| COMPOSITE NAME: | SHORT GI 320 | SHORT GI NSYM DISAMBIGUATION 322 | SU/MU[0] CODING 324 | LDPC EXTRA OFDM SYMBOL 326 | SU VHT-MCS/MU[1-3] CODING 328 | | | | RESERVED 338 | CRC 340 | TAIL 342 |
|---|---|---|---|---|---|---|---|---|---|---|---|
| SU NAME: | | | | | SU VHT-MCS 330 | | | BEAM-FORMED 336 | | | |
| MU NAME: | | | | | MU[1] CODING 332-1 | MU[2] CODING 332-2 | MU[3] CODING 332-3 | RESERVED 334-1 | RESERVED 334-2 | | | |
| BITS: | 1 | 1 | 1 | 1 | 1 | 1 | 1 | 1 | 1 | 1 | 8 | 6 |
| | B0 | B1 | B2 | B3 | B4 | B5 | B6 | B7 | B8 | B9 | B10 B17 | B18 B23 |

| nSTS/nSTS_Total | nLTF |
|---|---|
| 1 | 1 |
| 2 | 2 |
| 3 | 4 |
| 4 | 4 |
| 5 | 6 |
| 6 | 6 |
| 7 | 8 |
| 8 | 8 |

FIG. 4

| L-STF 502 | L-LTF 504 | L-SIG 506 | RLSIG 508 | HESIGA1 510-1 | HESIGA2 510-2 | HESTF 512 | HELTF1 514-1 | DATA-1 516-1 | ... | DATA-N 516-N |

| L-STF 502 | L-LTF 504 | L-SIG 506 | RLSIG 508 | HESIGA1 510-1 | HESIGA2 510-2 | HESIGB1 511-1 | ... | HESIGB N 511-N | HESTF 512 | HELTF1 514-1 | HELTF2 514-2 | DATA-1 516-1 | ... | DATA-N 516-N |

| L-STF 602 | L-LTF 604 | L-SIG 606 | RLSIG 608 | USIG 610 | EHTSIG 612 | EHTSTF 614 | EHTLTF 616 | DATA-1 618-1 | ... | DATA-N 618-N |

METHOD AND APPARATUS FOR WIRELESS COMMUNICATIONS

CROSS-REFERENCE TO RELATED APPLICATIONS

This application is entitled to the benefit of India Provisional Patent Application Serial Number 202021030033, filed on Jul. 15, 2020, which is incorporated by reference herein.

BACKGROUND

In wireless communications, wireless devices, e.g., transmitting devices or receiving devices, can exchange wireless information and execute various wireless operations in response to the wireless information. As an example, Long Training Field (LTF) symbols may be transmitted via packets by a transmitting device to a receiving device to assist with channel estimation at the receiving device. In such an example, channel estimation may be improved by including multiple LTF symbols in a packet. However, because the number of LTF symbols which may be included in the packet are limited by current communication protocols, wireless communication systems may experience limited performance and range capabilities.

SUMMARY

Embodiments of a method and an apparatus for wireless communications are disclosed. In an embodiment, a method for wireless communications involves generating a packet for transmission to a user, where generating the packet includes: encoding user signaling parameters and setting a station-identification (STA-ID) of the user to a value, where the signaling parameters include a number of space time streams (nSTS) spatial streams, establishing a dummy user without changing the user signaling parameters, setting a STA-ID of the dummy user to a value that is different from the STA-ID value of the user, indicating the nSTS spatial streams that are allocated to the dummy user and that are to include Long Training Field (LTF) symbols, and transmitting the packet to the user with the LTF symbols.

In an embodiment, no power is allocated to the dummy user in the LTF symbols of the packet.

In an embodiment, no power is allocated to the dummy user in a data portion of the packet.

In an embodiment, the packet has a Very High Throughput (VHT) multi-user (MU) (VHT-MU) packet format that includes: a Legacy Signal (LSIG) field in which a length (L_Length) subfield is set by adding a duration of the LTF symbols to a transmission time (TXTIME) vector of a Physical Layer Management Entity (PLME) subfield, a VHT Signal-A (VHTSIGA) field in which a Group-ID subfield is set to a value other than at least one of zero and sixty-three to indicate the VHT-MU packet format, and in which an MU nSTS subfield is set to:

sum of nSTS for a maximum number of users(nSTS_Total_High)−sum of nSTS for an actual number of users(nSTS_Total), and a VHT LTF (VHTLTF) field which transmits a number of LTF symbols (nLTF) determined by at least one of nSTS and nSTS_Total using a P matrix dimension of:

nSTS_Total×maximum nLTF symbols(nLTF_High).

In an embodiment, a non-zero value is added to the MU nSTS subfield.

In an embodiment, nSTS_Total_High−nSTS_Total is no greater than four.

In an embodiment, when there is less than three users, a user MU nSTS subfield is set to four and a dummy user MU nSTS subfield is set to:

nSTS_Total_High−nSTS_Total−4.

In an embodiment, the packet has a High Efficiency (HE) MU Orthogonal-Frequency Division Multiple Access (OFDMA) (HE-MU OFDMA) packet format that includes: an LSIG field in which an L_Length subfield is set by adding a duration of the LTF symbols to a TXTIME vector of a PLME subfield with m=1, HE Signal-A (HESIGA) fields in which bits B8 to B10 of HESIGA2 correspond to a number of HE LTF (HELTF) symbols and are set to nLTF_High, bits B18 to B21 of HESIGA1 correspond to a number of HE Signal-B (HESIGB) symbols for the dummy user, bit B22 of HESIGA1 corresponds to an HESIGB compressed mode subfield and is set to zero, an HESIGB Common field in which a Resource Unit (RU) Allocation subfield is set to a bandwidth RU allocation as per a signal bandwidth of transmission indicating the dummy user, an HESIGB User specific field where a dummy user subfield is added in which bits B0 to B10 correspond to a STA-ID subfield and are set to the STA-ID value of the dummy user, bits B11 to B13 correspond to an nSTS subfield and are set to:

a maximum number of space time streams (nSTS High)−nSTS_Total, bits B14 to B20 are set to a desired value, and an HELTF field which transmits nLTF_High number of HELTFs using a P matrix dimension of:

nSTS_Total×nLTF_High.

In an embodiment, the packet has an HE-MU non-OFDMA packet format that includes: an LSIG field in which an L_Length subfield is set by adding a duration of the LTF symbols to a TXTIME vector of a PLME subfield with m=1, HESIGA fields in which bits B18 to B21 of HESIGA1 correspond to a number of MU Multiple-Input Multiple-Output (MIMO) and are set to nUser+d, bit B22 of HESIGA1 corresponds to an HESIGB compressed mode subfield and is set to one, an HESIGB User specific field where a dummy user subfield is added in which bits B0 to B10 correspond to a STA-ID subfield and are set to the STA-ID value of the dummy user, bits B11 to B14 correspond to a spatial configuration subfield, bits B15 to B20 are set to a desired value, and an HELTF field which transmits nLTF_High number of HELTFs using a P matrix dimension of:

nSTS_Total×nLTF_High.

In an embodiment, the spatial configuration subfield of the HESIGB User specific field is set according to an 802.11ax communications protocol.

In an embodiment, "d" of nUser+d is a non-zero value that indicates nSTS_Total_High as a total number of streams in the packet.

In an embodiment, the packet has an Extremely High Throughput (EHT) MU OFDMA (EHT-MU OFDMA) packet format that includes: an LSIG field in which an L_Length subfield is set by adding a duration of the LTF symbols to a TXTIME parameter, a Compressed Mode subfield included in at least one of a Universal Signal (USIG) field and an EHT Signal (EHTSIG) field that indicates an Uncompressed mode, a number of LTFs present set to nLTF_High in at least one of the USIG field and the EHTSIG field, a number of EHTSIG symbols set using the dummy user, an RU Allocation subfield included in the EHTSIG field that is set to a bandwidth RU allocation that indicates the dummy user, a dummy user subfield included at the end of the EHTSIG field in which a STA-ID is set to the STA-ID value of the dummy user, an nSTS value is set to:

nSTS_Total_High−nSTS_Total, which indicates nSTS_Total_High as a total number of streams in the packet, and an EHT LTF (EHTLTF) field which transmits nLTF_High number of EHTLTFs using a P matrix dimension of:

nSTS_Total×nLTF_High.

In an embodiment, the packet has an EHT-MU non-OFDMA packet format that includes: an LSIG field in which an L_Length subfield is set by adding a duration of the LTF symbols to a TXTIME parameter, a Compressed Mode subfield included in at least one of a USIG field and an EHTSIG field that indicates a Compressed mode, a dummy user subfield included at the end of the EHTSIG field, and an EHTLTF field which transmits nLTF_High number of EHTLTFs using a P matrix dimension of:

nSTS_Total×nLTF_High.

In an embodiment, for the dummy user, a total number of streams in the packet is nSTS_Total_High and corresponds to nLTF_High.

An embodiment of a wireless device is also disclosed. The wireless device includes a processor configured to generate a packet for transmission to a user, where generation of the packet includes: encoding user signaling parameters and setting a STA-ID of the user to a value, where the signaling parameters include nSTS spatial streams, establishing a dummy user without changing the user signaling parameters, setting a STA-ID of the dummy user to a value that is different from the STA-ID value of the user, indicating the nSTS spatial streams that are allocated to the dummy user and that are to include LTF symbols, and transmit the packet to the user with the LTF symbols.

In an embodiment, the packet has a VHT-MU packet format that includes: an LSIG field in which an L_Length subfield is set by adding a duration of the LTF symbols to a TXTIME vector of a PLME subfield, a VHTSIGA field in which a Group-ID subfield is set to a value other than at least one of zero and sixty-three to indicate the VHT-MU packet format, and in which an MU nSTS subfield is set to:

nSTS_Total_High−nSTS_Total, and a VHTLTF field which transmits nLTF determined by at least one of nSTS and nSTS_Total using a P matrix dimension of:

nSTS_Total×nLTF_High.

In an embodiment, the packet has an HE-MU OFDMA packet format that includes: an LSIG field in which an L_Length subfield is set by adding a duration of the LTF symbols to a TXTIME vector of a PLME subfield with m=1, HESIGA fields in which bits B8 to B10 of HESIGA2 correspond to a number of HELTF symbols and are set to nLTF_High, bits B18 to B21 of HESIGA1 correspond to a number of HESIGB symbols for the dummy user, bit B22 of HESIGA1 corresponds to an HESIGB compressed mode subfield and is set to zero, an HESIGB Common field in which an RU Allocation subfield is set to a bandwidth RU allocation as per a signal bandwidth of transmission indicating the dummy user, an HESIGB User specific field where a dummy user subfield is added in which bits B0 to B10 correspond to a STA-ID subfield and are set to the STA-ID value of the dummy user, bits B11 to B13 correspond to an nSTS subfield and are set to:

nSTS High−nSTS_Total, bits B14 to B20 are set to a desired value, and an HELTF field which transmits nLTF_High number of HELTFs using a P matrix dimension of:

nSTS_Total×nLTF_High.

In an embodiment, the packet has an HE-MU non-OFDMA packet format that includes: an LSIG field in which an L_Length subfield is set by adding a duration of the LTF symbols to a TXTIME vector of a PLME subfield with m=1, HESIGA fields in which bits B18 to B21 of HESIGA1 correspond to a number of MU MIMO and are set to nUser+d, bit B22 of HESIGA1 corresponds to an HESIGB compressed mode subfield and is set to one, an HESIGB User specific field where a dummy user subfield is added in which bits B0 to B10 correspond to a STA-ID subfield and are set to the STA-ID value of the dummy user, bits B11 to B14 correspond to a spatial configuration subfield, bits B15 to B20 are set to a desired value, and an HELTF field which transmits nLTF_High number of HELTFs using a P matrix dimension of:

nSTS_Total×nLTF_High.

In an embodiment, the packet has an EHT-MU OFDMA packet format that includes: an LSIG field in which an L_Length subfield is set by adding a duration of the LTF symbols to a TXTIME parameter, a Compressed Mode subfield included in at least one of a USIG field and an EHTSIG field that indicates an Uncompressed mode, a number of LTFs present set to nLTF_High in at least one of the USIG field and the EHTSIG field, a number of EHTSIG symbols set using the dummy user, an RU Allocation subfield included in the EHTSIG field that is set to a bandwidth RU allocation that indicates the dummy user, a dummy user subfield included at the end of the EHTSIG field in which a STA-ID is set to the STA-ID value of the dummy user, an nSTS value is set to:

nSTS_Total_High−nSTS_Total, which indicates nSTS_Total_High as a total number of streams in the packet, and an EHTLTF field which transmits nLTF_High number of EHTLTFs using a P matrix dimension of:

nSTS_Total×nLTF_High.

In an embodiment, the packet has an EHT-MU non-OFDMA packet format that includes: an LSIG field in which an L_Length subfield is set by adding a duration of the LTF symbols to a TXTIME parameter, a Compressed Mode subfield included in at least one of a USIG field and an EHTSIG field that indicates a Compressed mode, a dummy user subfield included at the end of the EHTSIG field, and an EHTLTF field which transmits nLTF_High number of EHTLTFs using a P matrix dimension of:

nSTS_Total×nLTF_High.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 2A depicts an example of a packet with a Very High Throughput (VHT) single-user (SU) (VHT-SU) packet format that may include Long Training Field (LTF) symbols.

FIG. 2B depicts an example of a packet with a VHT multi-user (MU) (VHT-MU) packet format that may include LTF symbols in accordance with an embodiment of the invention.

FIG. 3A depicts an example of a VHT Signal-A1 (VHTSIGA1) field that may be included in a packet that has a VHT-SU packet format or a VHT-MU packet format.

FIG. 3B depicts an example of a VHT Signal-A2 (VHTSIGA2) field that may be included in a packet that has a VHT-SU packet format or a VHT-MU packet format.

FIG. 4 is a table that represents a number of LTF symbols (nLTFs) that may be included in a packet as determined by a number of space time streams (nSTS) or a sum of nSTS for an actual number of users (nSTS_Total).

FIG. 5A depicts an example of a packet that has a High Efficiency (HE) SU (HE-SU) packet format that may include LTF symbols.

FIG. 5B depicts an example of a packet that has an HE-MU packet format that may include LTF symbols in accordance with an embodiment of the invention.

FIG. 6 depicts an example of a packet that has an Extremely High Throughput (EHT) MU (EHT-MU) packet format that may include LTF symbols in accordance with an embodiment of the invention.

Throughout the description, similar reference numbers may be used to identify similar elements.

DETAILED DESCRIPTION

Figure 1:
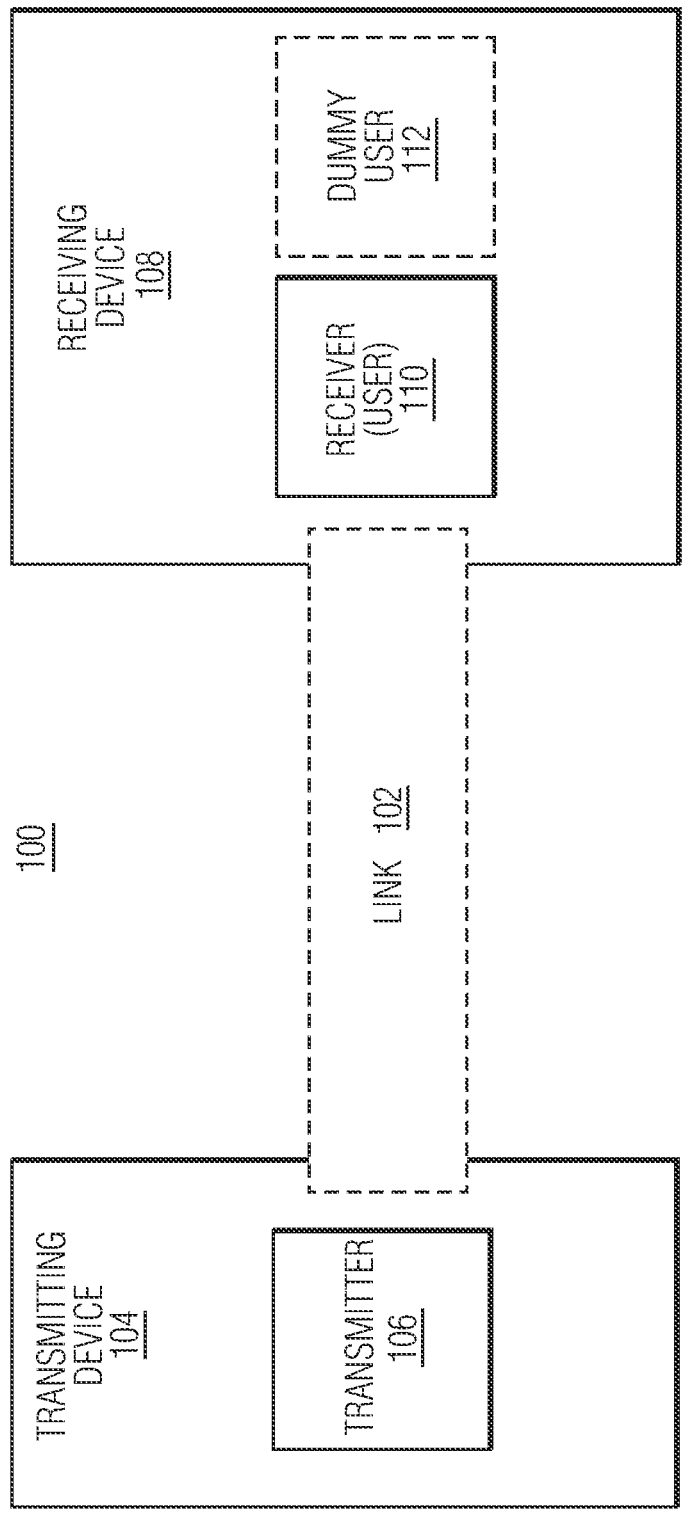
FIG. 1 depicts a wireless communications system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In embodiments of a wireless communications system, a wireless device, e.g., a transmitting device of a wireless local area network (WLAN) transmits data to at least one associated wireless device, e.g., a receiving device. As an example, a transmitting device may be an access point (AP) multi-link device (MLD) and a receiving device may be a station (STA) MLD or a non-AP STA MLD. In an embodiment, the transmitting device may include transmitters (e.g., APs) that transmit data to receivers (e.g., STAs or non-AP STAs) included in the receiving device. In an embodiment, the transmitting device may be configured to operate with receiving devices according to a communication protocol. For example, the communication protocol may be an Extremely High Throughput (EHT) communication protocol, or Institute of Electrical and Electronics Engineers (IEEE) 802.11be communication protocol. Features of wireless communications and multi-link communication systems operating in accordance with the EHT communication protocol and/or next-generation communication protocols may be referred to herein as "non-legacy" features. In some embodiments of the wireless communications system described herein, different associated receivers within range of a transmitter operating according to the EHT communication protocol are configured to operate according to at least one other communication protocol, which defines operation in a Basic Service Set (BSS) with the transmitter but are generally affiliated with lower data throughput protocols. The lower data throughput communication protocols (e.g., High Efficiency (HE) communication protocol, Very High Throughput (VHT) communication protocol, etc.) may be collectively referred to herein as "legacy" communication protocols.

FIG. 1 depicts a wireless communications system 100 that is used for wireless (e.g., WiFi) communications. In the embodiment depicted in FIG. 1, the wireless communications system includes one transmitting device, which is implemented as transmitting device 104, and one receiving device, which is implemented as receiving device 108. The wireless communications system can be used in various applications, such as industrial applications, medical applications, computer applications, and/or consumer or enterprise applications. In some embodiments, the wireless communications system may be compatible with an IEEE 802.11 protocol. For example, the wireless communications system may be compatible with the IEEE 802.11be protocol. Although the depicted wireless communications system 100 is shown in FIG. 1 with certain components and described with certain functionality herein, other embodiments of the wireless communications system may include fewer or more components to implement the same, less, or more functionality. For example, in some embodiments, the wireless communications system includes a single transmitting device with multiple receiving devices, or multiple transmitting devices with more than one receiving device. In another example, although the wireless communications system is shown in FIG. 1 as being connected in a certain topology, the network topology of the wireless communications system is not limited to the topology shown in FIG. 1. Although the system described with reference to FIG. 1 involves single-link communications, the techniques described herein are also applicable to multi-link communications. Furthermore, the techniques described herein may also be applicable to each link of a wireless communications system.

In the embodiment depicted in FIG. 1, the transmitting device 104 includes one radio, implemented as transmitter 106. In some embodiments, the transmitting device 104 implements upper layer Media Access Control (MAC) functionalities (e.g., beacon acknowledgement establishment, reordering of frames, etc.) and the transmitter 106 implements lower layer MAC functionalities (e.g., backoff, frame transmission, frame reception, etc.). The transmitter 106 may be implemented in hardware (e.g., circuits), software, firmware, or a combination thereof. The transmitter 106 may be fully or partially implemented as an integrated circuit (IC) device. In some embodiments, the transmitter 106 is a wireless AP compatible with at least one WLAN communications protocol (e.g., at least one IEEE 802.11 protocol). For example, the transmitter 106 may be a wireless AP compatible with the IEEE 802.11be protocol.

In some embodiments, a transmitting device (e.g., transmitting device 104) connects to a local area network (e.g., a LAN) and/or to a backbone network (e.g., the Internet) through a wired connection and wirelessly connects to receivers (e.g., wireless STAs), for example, through one or more WLAN communications protocols, such as the IEEE 802.11 protocol. In some embodiments, a transmitter (e.g., transmitter 106) includes at least one antenna, at least one transceiver operably connected to the at least one antenna, and at least one controller operably connected to the corresponding transceiver. In some embodiments, the at least one transceiver includes a physical layer (PHY) device. The at least one controller may be configured to control the at least one transceiver to process received packets through the at least one antenna. In some embodiments, the at least one controller may be implemented within a processor, such as a microcontroller, a host processor, a host, a digital signal processor (DSP), or a central processing unit (CPU), which can be integrated in a corresponding transceiver. In some embodiments, the transmitter 106 of the transmitting device 104 may operate in a BSS operating channel. For example, transmitter 106 may operate in a 320 MHz BSS operating channel, a 160 MHz BSS operating channel, an 80 MHz BSS operating channel, etc. Although the transmitting device 104 is shown in FIG. 1 as including one transmitter, other embodiments of the transmitting device 104 may include more than one transmitter.

In the embodiment depicted in FIG. 1, the receiving device, implemented as receiving device 108, includes one radio which is implemented as receiver 110, such that the receiver 110 may be a user for which the transmitter 106 generates and transmits a packet to. As an example, the user (e.g., receiver 110) may be an actual user, such that "actual user" may imply that the user may be part of (e.g., physically exist within) a receiving device (e.g., receiving device 108) and/or may be a user that a transmitter (e.g., transmitter 106) may want to exchange data and communicate with. In addition, the receiving device 108 may include a dummy user, implemented as dummy user 112, such that the dummy user 112 may be established by the transmitter 106 and/or transmitting device 104 without changing user (e.g., receiver 110) signaling parameters. As an example, the dummy user 112 may be established by the transmitter 106 and/or the transmitting device 104, such that establishing the dummy user 112 may involve encoding, in a packet, presence of the dummy user 112 when communicating with the receiving device 108. In an embodiment, "dummy user" may imply that the user may not be part of (e.g., may not physically exist within) a receiving device (e.g., receiving device 108) and/or may be a user that a transmitter (e.g., transmitter 106) may not have data to exchange and communicate with. In some embodiments, a dummy user may be a non-existent user.

In such an embodiment, the receiver 110 may be implemented in hardware (e.g., circuits), software, firmware, or a combination thereof. The receiver 110 may be fully or partially implemented as an IC device. In some embodiments, the receiver 110 may be part of the receiving device 108, such that the receiving device 108 may be a wireless device that wirelessly connects to transmitters (e.g., wireless APs). For example, the receiving device 108 may be implemented in a laptop, a desktop personal computer (PC), a mobile phone, or other communications device that supports at least one WLAN communications protocol. In some embodiments, the receiving device 108 may be a wireless device compatible with at least one IEEE 802.11 protocol (e.g., the IEEE 802.11be protocol). In some embodiments, the receiving device 108 implements a common MAC data service interface and the receiver 110 implements a lower layer MAC data service interface. In some embodiments, the receiver 110 includes at least one antenna, at least one transceiver operably connected to the at least one antenna, and at least one controller connected to the corresponding transceiver. In some embodiments, the at least one transceiver includes a PHY device. The at least one controller may be configured to control the at least one transceiver to process received packets through the at least one antenna. In some embodiments, the at least one controller may be implemented within a processor, such as a microcontroller, a host processor, a host, a DSP, or a CPU, which can be integrated in a corresponding transceiver. Although the receiving device 108 is shown in FIG. 1 as including one receiver (e.g., one user), other embodiments of the receiving device 108 may include more than one receiver (e.g., more than one user).

In the embodiment depicted in FIG. 1, the receiving device 108 communicates with the transmitting device 104 via a communication link, implemented as link 102. In an embodiment, a communication link (e.g., link 102) may include a BSS operating channel established by a transmitter (e.g., transmitter 106) that features multiple 20 MHz channels used to transmit frames and/or packets (e.g., Physical Layer Protocol Data Units (PPDUs), beacons, management frames, etc.) between the transmitting device 104 and the receiving device 108. In some embodiments, a 20 MHz channel may be a punctured 20 MHz channel or an unpunctured 20 MHz channel. In addition, although the transmitting device 104 communicates (e.g., wirelessly communicates) with the receiving device 108 via link 102, in other embodiments, the transmitting device 104 may communicate (e.g., wirelessly communicate) with the receiving device 108 via more than one communication link.

In an embodiment, wireless communications may involve two wireless devices (e.g., transmitting device 104 and receiving device 108) communicating with each other via the transmission and reception of packets (e.g., multi-user (MU) packets, single-user (SU) packets, down-link (DL) packets, up-link (UL) packets, etc.). In some embodiments, packets may include Long Training Field (LTF) symbols which may help a wireless device perform channel estimation, such that different packet formats may be used to transmit LTF symbols for different communication protocols. For example, the EHT communication protocol, the HE communication protocol, and/or the VHT communication protocol may each have a corresponding SU packet format (e.g., EHT-SU packet format, HE-SU packet format, and/or VHT-SU packet format, respectively) when transmitting a packet to a receiving device with a single user (e.g., one receiver). In such an embodiment, for a SU packet format, a number of LTF symbols (nLTF) included in the packet may be defined by a number of space time streams (nSTS) of the single user (e.g., receiver 110). As another example, the EHT communication protocol, the HE communication protocol, and/or the VHT communication protocol may each have a corresponding MU packet format when transmitting a packet to a receiving device with multiple users (e.g., multiple receivers). In an embodiment, for an EHT-MU packet format, nLTF may be derived from a Universal Signal (USIG) field and/or an EHT Signal (EHTSIG) field. In an embodiment, for an HE-MU packet format, nLTF may be derived from an HE Signal-A (HESIGA) field and/or an HE Signal-B (HESIGB) field. In an embodiment, for a VHT-MU packet format, nLTF may be defined by nSTS of a DL-MU packet.

Consequently, transmitting packets that include LTF symbols using the previously described packet formats may result in an increased signal-to-noise ratio (SNR) and/or noisy channel estimates as the packets also include Orthogonal Frequency-Division Multiplexing (OFDM) symbols. Although the SNR of channel estimates may be improved by including more LTF symbols in a packet, the nLTFs which may be included in a packet are currently limited as more LTF symbols may not be included without violating current communication protocols (e.g., the EHT communication protocol, the HE communication protocol, the VHT communication protocol, etc.).

In accordance with an embodiment of the invention, a technique for wireless communications involves generating a packet for transmission to a user, wherein generating the packet includes encoding user signaling parameters and setting a station-identification (STA-ID) of the user to a value, wherein the signaling parameters include an nSTS spatial streams, establishing a dummy user without changing the user signaling parameters, setting a STA-ID of the dummy user to a value that is different from the STA-ID value of the user, indicating the nSTS spatial streams that are allocated to the dummy user and that are to include LTF symbols, and transmitting the packet to the user with the LTF symbols. In some embodiments, the packet may be generated for more than one user (e.g., more than one receiver). In an embodiment, more LTF symbols than the nLTF currently allowed by legacy communication protocols and/or non-legacy communication protocols may be included in packets without violating the legacy communication protocols and/or non-legacy communication protocols. By increasing the nLTF which may be included in a packet and transmitted to a user (e.g., receiver), the SNR of channel estimates may be improved at the receiver without additional support. Thus, improving the SNR of channel estimates at the receiver may help further enhance performance and range improvement of wireless communication systems.

As described herein, a technique for including more LTF symbols than the nLTF currently allowed by legacy communication protocols and/or non-legacy communication protocols in a packet may involve the packet having a VHT packet format that may be generated and transmitted by wireless devices operating in accordance with the VHT communication protocol, an HE packet format that may be generated and transmitted by wireless devices operating in accordance with the HE communication protocol, or an EHT packet format that may be generated and transmitted by wireless devices operating in accordance with the EHT communication protocol and/or other future non-legacy communication protocols.

Examples of packets that have a VHT packet format that may include LTF symbols are described in further detail with reference to FIGS. 2A-2B.

FIG. 2A depicts an example of a packet, 200-1, that has a VHT-SU packet format that may include LTF symbols. With reference to FIG. 2A, the packet 200-1 that has the VHT-SU packet format is shown as including at least eight fields, implemented as a first field, Legacy Short Training Field (L-STF) field 202, a second field, Legacy Long Training Field (L-LTF) field 204, a third field, Legacy Signal (L-SIG) field 206, a fourth field, VHT Signal-A1 (VHTSIGA1) field 208-1, a fifth field, VHT Signal-A2 (VHTSIGA2) field 208-2, a sixth field, VHT Short Training Field (VHTSTF) field 210, a seventh field, VHT Long Training Field 1 (VHTLTF1) field 212-1, an eighth field, Data-1 214-1, and optional additional data field(s), Data-N 214-N, where N may be an integer greater than one.

With reference to FIG. 2A, the packet 200-1 that has the VHT-SU packet format may be generated and transmitted by a transmitting device (e.g., transmitting device 104) to a receiving device (e.g., receiving device 108) when the receiving device has a single user (e.g., one receiver). In an embodiment, the packet 200-1 that has the VHT-SU packet format may define nLTFs by nSTS of the single user for an SU packet format. In such an embodiment, the single user (e.g., one receiver) that receives the packet 200-1 may decode bits B10 to B12 of the VHTSIGA field (e.g., VHTSIGA1 field 208-1) to find bits B10 to B12 (i.e., "SU nSTS") and subsequently determine the nLTFs included in the packet.

FIG. 2B depicts an example of a packet, 200-2, that has a VHT-MU packet format that may include LTF symbols in accordance with an embodiment of the invention. With reference to FIG. 2B, the packet 200-2 that has the VHT-MU packet format is shown as including at least ten fields, implemented as a first field, L-STF field 202, a second field, L-LTF field 204, a third field, L-SIG field 206, a fourth field, VHTSIGA1 field 208-1, a fifth field, VHTSIGA2 field 208-2, a sixth field, VHTSTF field 210, a seventh field, VHTLTF1 field 212-1, an eighth field, VHTLTF2 field 212-2, a ninth field, VHT Signal-B1 (VHTSIGB1) field 213, a tenth field, Data-1 214-1, and optional additional data field(s), Data-N 214-N, where N may be an integer greater than one.

With reference to FIG. 2B, the packet 200-2 that has the VHT-MU packet format may be generated and transmitted by a transmitting device (e.g., transmitting device 104) to a receiving device (e.g., receiving device 108) when the receiving device has multiple users, when the receiving device has a single user (e.g., one receiver) and a dummy user (e.g., dummy user 112), or when the receiving device has multiple users and a dummy user (e.g., dummy user 112). In an embodiment, the packet 200-2 that has the VHT-MU packet format may define nLTFs by a sum of nSTS for an actual number of users (nSTS_Total) of each user for an MU packet format. In such an embodiment, the user (e.g., receiver) that receives the packet 200-2 may decode bits B10 to B21 of the VHTSIGA field (e.g., VHTSIGA1 field 208-1) to compute nSTS_Total and subsequently determine nLTFs included in the packet.

With further reference to FIG. 2B, in some embodiments, more LTF symbols than the nLTF currently allowed by the VHT communication protocol may be included in a packet that has a VHT-MU packet format (e.g., packet 200-2). In an embodiment, the packet 200-2 that has the VHT-MU packet format may be used when communicating with a receiving device with up to three users (e.g., three receivers). In another embodiment, the packet 200-2 that has the VHT-MU packet format may be used when communicating with a receiving device with a single user (e.g., one receiver) (with or without beamforming). In some embodiments, the packet 200-2 that has the VHT-MU packet format may be used when a transmitter (e.g., transmitter 106) wants to communicate with a single user with nSTS streams. In some embodiments, the packet 200-2 that has the VHT-MU packet format may be used when a transmitter (e.g., transmitter 106) wants to communicate with multiple users with nSTS_Total. In some embodiments, a number of users the transmitter wants to communicate with may be represented by nUsers. For example, when the transmitter communicates with a single user, then nUsers may be equal to one. In some embodiments, nLTF may be a number of LTF symbols included in a packet, such that nLTF may be determined by nSTS or nSTS_Total (sometimes referred to herein as "nSTS/nSTS_Total"). In some embodiments, a transmitter (e.g., transmitter 106) may want to transmit maximum nLTF symbols (nLTF_High), such that nLTF_High may correspond to a sum of nSTS for a maximum number of users (nSTS_Total_High).

Examples of VHTSIGA fields that may be included in a packet that has a VHT-SU packet format or a VHT-MU packet format are described in further detail with reference to FIGS. 3A-3B.

FIG. 3A depicts an example of a VHTSIGA1 field, 300-1, that may be included in a packet that has a VHT-SU packet format or a VHT-MU packet format. As an example, the VHTSIGA1 field 300-1 may be implemented as the VHTSIGA1 field 208-1 of the packet 200-1 or the packet 200-2. With reference to FIG. 3A, the VHTSIGA1 field 300-1 is shown as including several subfields for a composite packet format (shown by the row that corresponds to "composite name:"), a VHT-SU packet format (shown by the row that corresponds to "SU name:"), and a VHT-MU packet format (shown by the row that corresponds to "MU name:"). In particular, for each of the packet formats (e.g., composite packet format, VHT-SU packet format, and VHT-MU packet format), six subfields may be the same. For example, each packet format may include a Bandwidth (BW) subfield 302 that is bits B0 to B1 (2-bits), a first Reserved subfield 304-1 that is bit B2 (1-bit), a Space-Time Block Coding (STBC) subfield 306 that is bit B3 (1-bit), a Group Identification (Group ID) subfield 308 that is bits B4 to B9 (6-bits), a Transmission Opportunity Power Save Not Allowed (TXOP_PS_NOT_ALLOWED) subfield 316 that is bit B22 (1-bit), and a second Reserved subfield 304-2 that is bit B23 (1-bit).

Additionally, in an embodiment, for the composite packet format, the VHTSIGA1 field 300-1 may include an nSTS/Partial Association ID (AID) subfield 310 that is bits B10 to B21 (12-bits). In an embodiment, for the VHT-SU packet format, the VHTSIGA1 field 300-1 may include an SU nSTS subfield 311 that is bits B10 to B12 (3-bits) and a Partial Aid subfield 312 that is bits B13 to B21 (9-bits). In an embodiment, for the VHT-MU packet format, the VHTSIGA1 field 300-1 may include an MU[0] nSTS subfield 314-0 that is bits B10 to B12 (3-bits), an MU[1] nSTS subfield 314-1 that is bits B13 to B15 (3-bits), an MU[2] nSTS subfield 314-2 that is bits B16 to B18 (3-bits), and an MU[3] nSTS subfield 314-3 that is bits B19 to B21 (3-bits).

FIG. 3B depicts an example of a VHTSIGA2 field, 300-2, that may be included in a packet that has a VHT-SU packet format or a VHT-MU packet format. As an example, the VHTSIGA2 field 300-2 may be implemented as the VHTSIGA2 field 208-2 of the packet 200-1 or the packet 200-2. With reference to FIG. 3B, the VHTSIGA2 field 300-2 is shown as including several subfields for a composite packet format (shown by the row that corresponds to "composite name:"), a VHT-SU packet format (shown by the row that corresponds to "SU name:"), and a VHT-MU packet format (shown by the row that corresponds to "MU name:"). In particular, for each of the packet formats (e.g., composite packet format, VHT-SU packet format, and VHT-MU packet format), seven subfields may be the same. For example, each packet format may include a Short Guard Interval (GI) subfield 320 that is bit B0 (1-bit), a Short GI Number of OFDM Symbols in a Data Field (NSYM) Disambiguation subfield 322 that is bit B1 (1-bit), an SU/MU[0] Coding subfield 324 that is bit B2 (1-bit), a Low Density Parity Check (LDPC) Extra OFDM Symbol subfield 326 that is bit B3 (1-bit), a Reserved subfield 338 that is bit B9 (1-bit), a Cyclic Redundancy Check (CRC) subfield 340 that is bits B10 to B17 (8-bits), and a Tail subfield 342 that is bits B18 to B23 (6-bits).

Additionally, in an embodiment, for the composite packet format, the VHTSIGA2 field 300-2 may include an SU VHT Modulation and Coding Scheme (MCS) (VHT-MCS)/MU[1-3] Coding subfield 328 that is bits B4 to B7 (4-bits) and a Beamformed subfield 336 that is bit B8 (1-bit). In an embodiment, for the VHT-SU packet format, the VHTSIGA2 field 300-2 may include an SU VHT-MCS subfield 330 that is bits B4 to B7 (4-bits) and a Beamformed subfield 336 that is bit B8 (1-bit). In an embodiment, for the VHT-MU packet format, the VHTSIGA2 field 300-2 may include an MU[1] Coding subfield 332-1 that is bit B4 (1-bit), an MU[2] Coding subfield 332-2 that is bit B5 (1-bit), an MU[3] Coding subfield 332-3 that is bit B6 (1-bit), a first Reserved subfield 334-1 that is bit B7 (1-bit), and a second Reserved subfield 334-2 that is bit B8 (1-bit).

A table that represents nLTFs which may be included in a packet as determined by nSTS or nSTS_Total is described in further detail with reference to FIG. 4.

FIG. 4 is a table, 400, that represents nLTFs that may be included in a packet as determined by nSTS or nSTS_Total. In particular, the table 400 shown in FIG. 4 depicts two columns, implemented as a first column which represents an nSTS or an nSTS_Total (shown by nSTS/nSTS_Total), and a second column which represents a corresponding nLTF value. In some embodiments, the table 400 may be referenced by a user when receiving a packet, such that the user decodes a field of the packet to determine the nLTFs that may be included in the packet from the nSTS or the nSTS_Total of the packet. For example, when a receiving device without dummy users and with a single user receives a packet with a VHT-SU packet format (e.g., packet 200-1), the single user may decode bits B10 to B12 of a VHTSIGA field (i.e., SU nSTS subfield 311) to find nSTS of the single user and subsequently nLTF. As another example, when a receiving device with a single user and with a dummy user (e.g., receiving device 108), a receiving device with multiple users and without a dummy user, or a receiving device with multiple users and with a dummy user receives a packet with a VHT-MU packet format (e.g., packet 200-2), a receiving user (e.g., receiver 110) of the receiving device may decode bits B10 to B21 of a VHTSIGA field (e.g., MU[1] nSTS subfield 314-1, MU[2] nSTS subfield 314-2, and MU[3] nSTS subfield 314-3 of VHTSIGA1 field 300-1) to compute nSTS_Total of each user and subsequently nLTF.

In some embodiments, when a transmitter (e.g., transmitter 106) generates and transmits a packet that has a VHT-MU packet format (e.g., packet 200-2), the VHT-MU packet format may include an LSIG field (e.g., L-SIG field 206) in which a length (L_Length) subfield may be set by adding a duration of extra LTF symbols to a transmission time (TXTIME) vector of a Physical Layer Management Entity (PLME) subfield. In some embodiments, the VHT-MU packet format may include a VHTSIGA field (e.g., VHTSIGA1 300-1) in which a Group-ID subfield (e.g., Group ID subfield 308) may be set to a value other than zero and sixty-three to indicate the VHT-MU packet format. In an embodiment, the VHT-MU packet format also includes an MU nSTS subfield (e.g., MU[1] nSTS subfield 314-1, MU[2] nSTS subfield 314-2, and MU[3] nSTS subfield 314-3 of VHTSIGA1 field 300-1) which may be set to:

$$nSTS\_Total\_High - nSTS\_Total \quad (1).$$

In such an embodiment, a non-zero value may be added to an extra (unused) user field of the MU nSTS subfield and the user index technique may be unchanged. In such an embodiment, (1) may be no greater than four. As an example, if there are less than three users (e.g., nUser is less than or equal to two), then the transmitter sets a corresponding user MU nSTS subfield to four and sets a dummy user MU nSTS subfield to:

$$nSTS\_Total\_High - nSTS\_Total - 4 \quad (2).$$

In an embodiment, the VHT-MU packet format includes a VHTLTF field (e.g., VHTLTF1 field 212-1 and VHTLTF2 field 212-2) that may transmit nLTF determined by nSTS or nSTS_Total using a P matrix dimension of:

$$nSTS\_Total \times nLTF\_High \quad (3).$$

In an embodiment, the VHTLTF field may transmit nLTF_High number of VHTLTFs as specified by 802.11ac Draft 7.0. In an embodiment, the transmitter may use the P matrix dimension according to (3) instead of:

$$nSTS \times nLTF \quad (4),$$

or $$nSTS\_Total \times nLTF \quad (5).$$

In such embodiments, no change may be made on a precoding matrix and/or a spatial mapping matrix. In addition, in such an embodiment, no change may be made to user indexing in a USER_POSITION array communicated by the transmitter to a corresponding user (e.g., receiver) prior to transmission of the packet. In some embodiments, for a dummy user (e.g., nUser+1) MU nSTS subfield, an additional entry may be added and indexed after each corresponding user (e.g., nUsers) in the USER_POSITION array.

In an embodiment, receiving the packet 200-2 that has the VHT-MU packet format at the receiver (e.g., corresponding user) from the transmitter may involve a processing scheme of the receiver being unchanged, such that a receiving device may continue to communicate and/or operate according to an IEEE 802.11n communication protocol. As an example, the receiver may be allocated streams from nSTS_User Start to nSTS_User End in the packet that has the VHT-MU packet format. In such an example, the receiver may determine that the packet has the VHT-MU packet format by decoding a Group ID subfield (e.g., Group ID subfield 308) of a VHTSIGA field (e.g., VHTSIGA1 field 208-1). In such an example, the receiver may then compute nSTS_Total by summing up MU[0] nSTS to MU[3] nSTS via bits included in, e.g., MU[1] nSTS subfield 314-1, MU[2] nSTS subfield 314-2, and MU[3] nSTS subfield 314-3, and may then compute nSTS_Total for the receiver (nSTS_Total_Rx), such that nSTS_Total_Rx may be equal to nSTS_Total_High which corresponds to nLTF_High. Additionally, in such an example, the receiver may use a P matrix dimension of:

$$[nSTS\_User\_Start: nSTS\_User\_End] \times nLTF\_High \quad (6)$$

to attain the receiver's corresponding specific channel estimates. Furthermore, in such an example, no additional processing may be needed by the receiver and the receiver may continue to function as prior to implementation of such a technique, improving the receiver's channel estimates by using nLTF_High as number of LTFs instead of nLTF number of LTFs.

Examples of packets that have an HE packet format that may include LTF symbols are described in further detail with reference to FIGS. 5A-5B.

FIG. 5A depicts an example of a packet, 500-1, that has an HE-SU packet format that may include LTF symbols. In some embodiments, the packet 500-1 that has the HE-SU packet format may be transmitted to a single stream user. With reference to FIG. 5A, the packet 500-1 that has the HE-SU packet format is shown as including at least nine fields, implemented as a first field, L-STF field 502, a second field, L-LTF field 504, a third field, L-SIG field 506, a fourth field, Repeated Legacy Signal (RLSIG) field 508, a fifth field, HE Signal-A1 (HESIGA1) field 510-1, a sixth field, HE Signal-A2 (HESIGA2) field 510-2, a seventh field, HE Short Training Field (HESTF) field 512, an eighth field, HE Long Training Field 1 (HELTF1) field 514-1, a ninth field, Data-1 516-1, and optional additional data field(s), Data-N 516-N, where N may be an integer greater than one.

With reference to FIG. 5A, the packet 500-1 that has the HE-SU packet format may be generated and transmitted by a transmitting device (e.g., transmitting device 104) to a receiving device (e.g., receiving device 108) when the receiving device has a single user (e.g., one receiver). In an embodiment, the packet 500-1 that has the HE-SU packet format may define nLTFs by nSTS of the single user for an SU packet format.

FIG. 5B depicts an example of a packet, 500-2, that has an HE-MU packet format that may include LTF symbols in accordance with an embodiment of the invention. In some embodiments, the packet 500-2 that has the HE-MU packet format may be transmitted to two users with one stream per-user. In some embodiments, the HE-MU packet format may be an HE-MU Orthogonal-Frequency Division Multiple Access (OFDMA) (HE-MU OFDMA) packet format and/or an HE-MU non-OFDMA packet format. With reference to FIG. 5B, the packet 500-2 that has the HE-MU packet format is shown as including at least eleven fields, implemented as a first field, L-STF field 502, a second field, L-LTF field 504, a third field, L-SIG field 506, a fourth field, RLSIG field 508, a fifth field, HESIGA1 field 510-1, a sixth field, HESIGA2 field 510-2, a seventh field, HE Signal-B1 (HESIGB1) 511-1, optional additional HESIGB N field(s), HESIGB N field 511-N (N may be an integer greater than one), an eighth field, HESTF field 512, a ninth field, HELTF1 field 514-1, a tenth field, HELTF2 field 514-2, an eleventh field, Data-1 516-1, and optional additional data field(s), Data-N 516-N, where N may be an integer greater than one.

With reference to FIG. 5B, the packet 500-2 that has the HE-MU packet format may be generated and transmitted by a transmitting device (e.g., transmitting device 104) to a receiving device (e.g., receiving device 108) when the receiving device has multiple users, when the receiving device has a single user (e.g., one receiver) and a dummy user (e.g., dummy user 112), or when the receiving device has multiple users and a dummy user (e.g., dummy user 112). In an embodiment, the packet 500-2 that has the HE-MU packet format may define nLTFs by nSTS_Total of each user for an MU packet format.

With further reference to FIG. 5B, in some embodiments, more LTF symbols than the nLTF currently allowed by the HE communication protocol may be included in the packet 500-2 that has the HE-MU packet format. In an embodiment, the packet 500-2 that has the HE-MU packet format may be used when communicating with a receiving device with up to seven users (e.g., seven receivers). In another embodiment, the packet 500-2 that has the HE-MU packet format may be used when communicating with a receiving device with a single user (e.g., one receiver) (with or without beamforming). In some embodiments, the packet 500-2 that has the HE-MU packet format may be used when a transmitter (e.g., transmitter 106) wants to communicate with a single user with nSTS streams. In some embodiments, the packet 500-2 that has the HE-MU packet format may be used when a transmitter (e.g., transmitter 106) wants to communicate with multiple users with nSTS_Total. In some embodiments, a number of users the transmitter wants to communicate with may be represented by nUsers. For example, when the transmitter communicates with a single user, then nUsers may be equal to one. In some embodiments, nLTF may be a number of LTF symbols included in a packet, such that nLTF may be determined by nSTS or nSTS_Total. In some embodiments, a transmitter may want to transmit nLTF_High, such that nLTF_High may correspond to a maximum number of space time streams (nSTS_High).

In some embodiments, when a transmitter (e.g., transmitter 106) generates and transmits a packet that has an HE-MU packet format (e.g., packet 500-2), such that the HE-MU packet format may be an HE-MU OFDMA packet format, the HE-MU OFDMA packet format may include an LSIG field (e.g., L-SIG field 506) in which an L_Length subfield may be set by adding a duration of extra LTF symbols to a TXTIME vector of a PLME subfield with m=1. In such an embodiment, m=1 may be in accordance with section 27.3.11.5 of 802.11ax Draft 8.0, such that the LSIG field may indicate the MU packet format (e.g., HE-MU OFDMA packet format).

In an embodiment, the packet that has the HE-MU OFDMA packet format may include HESIGA fields (e.g., HESIGA1 field 510-1 and HESIGA2 field 510-2) in accordance with table 27-20 of 802.11ax Draft 8.0. In such an embodiment, bits B8 to B10 of HESIGA2 may correspond to a number of HELTF symbols and may be set to nLTF_High, bits B18 to B21 of HESIGA1 may correspond to a number of HESIGB symbols for the dummy user (nUser+1), and bit B22 of HESIGA1 may correspond to an HESIGB compressed mode subfield and may be set to zero. In an embodiment, the packet that has the HE-MU OFDMA packet format may include an HESIGB Common field (e.g., HESIGB1 511-N and/or HESIGB N 511-N) in which a Resource Unit (RU) Allocation subfield may be set to a bandwidth RU allocation as per a signal bandwidth of transmission indicating the dummy user. In an embodiment, the HESIGB Common field may be in accordance with table 27-24 of 802.11ax Draft 8.0.

Additionally, in some embodiments, the packet that has the HE-MU OFDMA packet format may include an HESIGB User specific field where a dummy user subfield may be added in which bits B0 to B10 may correspond to a STA-ID subfield and may be set to a STA-ID value of a dummy user, bits B11 to B13 may correspond to an nSTS subfield and may be set to:

$$nSTS\_High-nSTS\_Total \quad (7),$$

and bits B14 to B20 may be set to a desired value. In such an embodiment, the STA-ID value of the dummy user may be set to a value that may not correspond with a STA-ID value of actual users within a current BSS with the dummy user. In an embodiment, the HESIGB User specific field may be in accordance with table 27-24 of 802.11ax Draft 8.0. Furthermore, the packet that has the HE-MU OFDMA packet format may also include an HELTF field (e.g., HELTF1 514-1 and HELTF2 514-2) which may transmit nLTF_High number of HELTFs using a P matrix dimension of:

$$nSTS\_Total \times nLTF\_High \quad (8).$$

In such an embodiment, the HELTF field may transmit nLTF_High number of HELTFS as per 802.11ax Draft 8.0.

In an embodiment, receiving the packet that has the HE-MU OFDMA packet format at a receiver (e.g., corresponding user) from the transmitter may involve a processing scheme of the receiver being unchanged, such that a receiving device may continue to communicate and/or operate according to the IEEE 802.11ax communication protocol.

As an example, the receiver may be allocated streams from nSTS_User_Start to nSTS_User_End in the packet that has the HE-MU packet format (e.g., HE-MU OFDMA packet format). In such an example, the receiver may determine that the packet has the HE-MU OFDMA packet format by decoding m=1 of the L_Length subfield of the LSIG field and the HESIGB compressed mode subfield of the HESIGA field (bit B22) as zero. In such an example, the receiver may then decode bits B8 to B10 of HESIGA2 which correspond to the number of HELTF symbols as nLTF_High, and bits B8 to B21 of HESIGA1 which correspond to the number of HESIGB symbols for the dummy user (nUser+1). In such an example, the receiver may then decode the RU Allocation subfield of the HESIGB Common field as a full bandwidth RU Allocation that may be indicated for the dummy user. In addition, in such an example, the receiver may decode the HESIGB User specific field for which bits B0 to B10 may be a STA-ID value that matches a STA-ID value of the receiver (e.g., user), such that the receiver may ignore other HESIGB User specific fields. In such an example, the receiver may use a P matrix dimension according to (6) to attain the receiver's corresponding stream specific channel estimates. Furthermore, in such an example, no additional processing may be needed by the receiver and the receiver may continue to function as prior to implementation of such a technique, improving the receiver's channel estimates by using nLTF_High as number of LTFs instead of nLTF number of LTFs.

In some embodiments, when a transmitter (e.g., transmitter 106) generates and transmits a packet that has an HE-MU packet format (e.g., packet 500-2), such that the HE-MU packet format may be an HE-MU non-OFDMA packet format, the HE-MU non-OFDMA packet format may include an LSIG field (e.g., L-SIG field 506) in which an L_Length subfield may be set by adding a duration of extra LTF symbols to a TXTIME vector of a PLME subfield with m=1. In such an embodiment, m=1 may be in accordance with section 27.3.11.5 of 802.11ax Draft 8.0, such that the LSIG field may indicate the MU packet format (e.g., HE-MU non-OFDMA packet format).

In an embodiment, the packet that has the HE-MU non-OFDMA packet format may include HESIGA fields (e.g., HESIGA1 field 510-1 and HESIGA2 field 510-2) in which bits B18 to B21 of HESIGA1 may correspond to a number of MU Multiple-Input Multiple-Output (MIMO) users and may be set to nUser+d, and bit B22 of HESIGA1 may correspond to an HESIGB compressed mode subfield and may be set to one, such that the HESIGA fields may be in accordance with table 27-20 of 802.11ax Draft 8.0. In such an embodiment, "d" of nUser+d may be a non-zero value that may indicate nSTS_Total_High as a total number of streams in a packet.

In an embodiment, the packet that has the HE-MU non-OFDMA packet format may include an HESIGB User specific field that may be in accordance with table 27-24 of 802.11ax Draft 8.0. In such an embodiment, for the HESIGB User specific field, a dummy user subfield may be added in which bits B0 to B10 may correspond to a STA-ID subfield and may be set to a STA-ID value of a dummy user, bits B11 to B14 may correspond to a spatial configuration subfield, and bits B15 to B20 may be set to a desired value. In an embodiment, the spatial configuration subfield of the HESIGB User specific field may be in accordance with the 802.11ax communication protocol and the STA-ID value of the dummy user may be set to a value that may not correspond with a STA-ID value of actual users within a current BSS with the dummy user. In an embodiment, the spatial configuration subfield of the HESIGB User specific field may be set as per as per table 27-30 of 802.11ax Draft 8.0 corresponding to a row of "nUser+d", such that columns corresponding from one to nUsers may be the same as prior to implementation of such a technique and may be non-zero entries from columns nUser+1 to nUser+d so that a total number of streams in the packet may be nSTS_Total_High. In such an embodiment, the transmitter that may generate and transmit the packet may have flexibility to choose a non-zero value of "d" that may indicate nSTS_Total_High as the total number of streams in the packet.

Additionally, in an embodiment, the packet that has the HE-MU non-OFDMA packet format may include an HELTF field (e.g., HELTF1 field 514-1 and HELTF2 field 514-2) which transmits nLTF_High number of HELTFs using a P matrix dimension according to (8) (as per 802.11ax Draft 8.0). In such an embodiment, there may be no change made to a precoder/spatial mapping matrix.

In an embodiment, receiving the packet that has the HE-MU non-OFDMA packet format at a receiver (e.g., corresponding user) from the transmitter may involve a processing scheme of the receiver being unchanged, such that a receiving device may continue to communicate and/or operate according to the IEEE 802.11ax communication protocol.

As an example, the receiver may be allocated streams from nSTS_User_Start to nSTS_User_End in the packet that has the HE-MU packet format (e.g., HE-MU non-OFDMA packet format). In such an example, the receiver may determine that the packet has the HE-MU non-OFDMA packet format by decoding m=1 of the L_Length subfield of the LSIG field and the HESIGB compressed mode subfield of the HESIGA field (bit B22) as one. In such an example, the receiver may then decode bits B8 to B21 of HESIGA which may correspond to a number of MU MIMO users that may correspond to nUser+d. In such an example, the receiver may then decode the HESIGB User specific field for which bits B0 to B10 may be a STA-ID value that matches a STA-ID value of the receiver (e.g., user). In such an example, the receiver may find a stream start index and a stream end index from the spatial configuration subfield (bits B11 to B14) of the HESIGB field, such that the receiver may find the stream start index and the stream end index similar as prior to implementation of such a technique by referencing table 27-30 of 802.11ax Draft 8.0 corresponding to row of nUser+d. Additionally, in such an example, the receiver may also find a total number of streams in the packet as nSTS_Total_High from the spatial configuration subfield, and subsequently nLTF_High. In such an example, the receiver may use a P matrix dimension according to (6) to attain the receiver's corresponding stream specific channel estimates. Furthermore, in such an example, no additional processing may be needed by the receiver and the receiver may continue to function as prior to implementation of such a technique, improving the receiver's channel estimates by using nLTF_High as number of LTFs instead of nLTF number of LTFs.

An example of a packet that has an EHT packet format that may include LTF symbols are described in further detail with reference to FIG. 6.

FIG. 6 depicts an example of a packet, 600, that has an EHT-MU packet format that may include LTF symbols in accordance with an embodiment of the invention. In some embodiments, the EHT-MU packet format may be an EHT-MU OFDMA packet format and/or an EHT-MU non-OFDMA packet format. With reference to FIG. 6, the packet 600 that has the EHT-MU packet format is shown as including at least nine fields, implemented as a first field, L-STF field 602, a second field, L-LTF field 604, a third field, L-SIG field 606, a fourth field, RLSIG field 608, a fifth field, USIG field 610, a sixth field, EHT Signal (EHTSIG) field 612, a seventh field, EHT Short Training Field (EHT-STF) field 614, an eighth field, EHT Long Training Field (EHTLTF) field 616, a ninth field, Data-1 618-1, and optional additional data field(s), Data-N 618-N, where N may be an integer greater than one.

With reference to FIG. 6, the packet 600 that has the EHT-MU packet format may be generated and transmitted by a transmitting device (e.g., transmitting device 104) to a receiving device (e.g., receiving device 108) when the receiving device has multiple users, when the receiving device has a single user (e.g., one receiver) and a dummy user (e.g., dummy user 112), or when the receiving device has multiple users and a dummy user (e.g., dummy user 112). In some embodiments, more LTF symbols than the nLTF currently allowed by the EHT communication protocol may be included in the packet 600 that has the EHT-MU packet format. In an embodiment, the packet 600 that has the EHT-MU packet format may be used when communicating with a receiving device with up to seven users (e.g., seven receivers). In another embodiment, the packet 600 that has the EHT-MU packet format may be used when communicating with a receiving device with a single user (e.g., one receiver) (with or without beamforming).

In some embodiments, when a transmitter (e.g., transmitter 106) generates and transmits a packet that has an EHT-MU packet format (e.g., packet 600), such that the EHT-MU packet format may be an EHT-MU OFDMA packet format, the EHT-MU OFDMA packet format may include an LSIG field (e.g., L-SIG field 606) in which an L_Length subfield may be set by adding a duration of LTF symbols to a TXTIME parameter. In an embodiment, the packet that has the EHT-MU OFDMA packet format may include a Compressed Mode subfield in a USIG field (e.g., USIG field 610) or an EHTSIG field (e.g., EHTSIG field 612) that may indicate an Uncompressed mode.

Additionally, in such an embodiment, the packet that has the EHT-MU OFDMA packet format may include a number of LTFs present that may be set to nLTF_High in the USIG field or the EHTSIG field. In such an embodiment, the packet that has the EHT-MU OFDMA packet format may include a number of EHTSIG symbols which may be set using a dummy user (nUser+1) similar to the 802.11ax communication protocol. In such an embodiment, the packet that has the EHT-MU OFDMA packet format may also include an RU Allocation subfield included in the EHTSIG field that may be set to a bandwidth RU allocation that may indicate the dummy user.

In some embodiments, the packet that has the EHT-MU OFDMA packet format may include a dummy user subfield at the end of the EHTSIG field in which a STA-ID may be set to a STA-ID value of the dummy user, and an nSTS value which may be set according to (1), which may indicate nSTS_Total_High as a total number of streams in the packet. In such an embodiment, the STA-ID value of the dummy user may not match an AID value of actual users within a current BSS with the dummy user. Furthermore, in an embodiment, the packet that has the EHT-MU OFDMA packet format may also include an EHTLTF field (e.g., EHTLTF field 616) that may transmit nLTF_High number of EHTLTFs using a P matrix dimension according to (8). In such an embodiment, there may be no change made to a precoder/spatial mapping matrix.

In some embodiments, when a transmitter (e.g., transmitter 106) generates and transmits a packet that has an EHT-MU packet format (e.g., packet 600), such that the EHT-MU packet format may be an EHT-MU non-OFDMA packet format, the EHT-MU non-OFDMA packet format may include an LSIG field (e.g., L-SIG field 606) in which an L_Length subfield may be set by adding a duration of LTF symbols to a TXTIME parameter. In an embodiment, the packet that has the EHT-MU non-OFDMA packet format may include a Compressed Mode subfield in a USIG field (e.g., USIG field 610) or an EHTSIG field (e.g., EHTSIG field 612) that may indicate a Compressed mode.

Additionally, in such an embodiment, the packet that has the EHT-MU non-OFDMA packet format may include other subfields within an EHTSIG field (e.g., EHTSIG field 612) for different symbols to be transmitted in the Compressed mode. In such an embodiment, the transmitter that may generate and transmit the packet that has the EHT-MU non-OFDMA packet format may proceed similarly as described for the HE-MU non-OFDMA packet format. For example, the transmitter may indicate an extra number of users (e.g., dummy user(s)) in relevant fields, add extra user subfields for dummy users at the end of the EHTSIG field, and allocate streams to the dummy users, such that a total number of streams in the packet may be nSTS_Total_High and which may correspond to nLTF_High.

Furthermore, in an embodiment, the packet that has the EHT-MU non-OFDMA packet format may also include an EHTLTF field (e.g., EHTLTF field 616) that may transmit nLTF_High number of EHTLTFs using a P matrix dimension according to (8). In such an embodiment, there may be no change made to a precoder/spatial mapping matrix.

Figure 7:
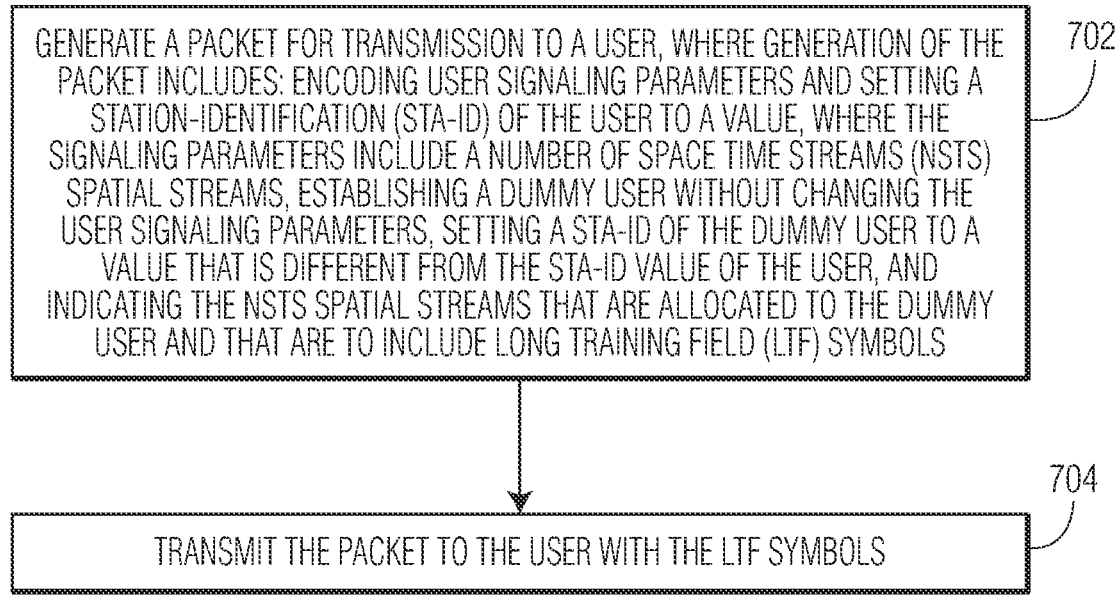
FIG. 7 illustrates a flow diagram of a technique for wireless communications in accordance with an embodiment of the invention.

FIG. 7 illustrates a flow diagram of a technique for wireless communications in accordance with an embodiment of the invention. At block 702, a packet may be generated for transmission to a user, where generation of the packet includes: encoding user signaling parameters and setting a STA-ID of the user to a value, where the signaling parameters include nSTS spatial streams, establishing a dummy user without changing the user signaling parameters, setting a STA-ID of the dummy user to a value that is different from the STA-ID value of the user, and indicating the nSTS spatial streams that are allocated to the dummy user and that are to include LTF symbols. At block 704, the packet may be transmitted to the user with the LTF symbols.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for wireless communications, the method comprising:
   generating a multi-user (MU) Multiple-Input Multiple-Output (MIMO) packet for transmission to a user, wherein generating the packet includes:
   encoding user signaling parameters and setting a station-identification (STA-ID) of the user to a value, wherein the signaling parameters include a number of space time streams (nSTS) spatial streams;

establishing a dummy user without changing the user signaling parameters;

setting a STA-ID of the dummy user to a value that is different from the STA-ID value of the user;

indicating the nSTS spatial streams that are allocated to the dummy user and that are to include Long Training Field (LTF) symbols; and transmitting the packet to the user with the LTF symbols, wherein the nSTS spatial streams that are allocated to the dummy user is selected to increase a number of LTF symbols in the packet to a maximum number defined by a packet format, wherein no power is allocated for transmission of data in a data portion of the packet to the dummy user, and wherein the nSTS spatial streams allocated to the dummy user cause a receiver of the packet to include the nSTS spatial streams in a sum of nSTS spatial streams indicative of the maximum number of LTF symbols.

2. The method of claim 1, wherein no power is allocated to the dummy user in the LTF symbols of the packet.

3. The method of claim 1, wherein the packet has a Very High Throughput (VHT) multi-user (MU) (VHT-MU) packet format that includes:

a Legacy Signal (LSIG) field in which a length (L_Length) subfield is set by adding a duration of the LTF symbols to a transmission time (TXTIME) vector of a Physical Layer Management Entity (PLME) subfield;

a VHT Signal-A (VHTSIGA) field in which a Group-ID subfield is set to a value other than at least one of zero and sixty-three to indicate the VHT-MU packet format, and in which an MU nSTS subfield is set to:

sum of nSTS for a maximum number of users (nSTS_Total_High)−sum of nSTS for an actual number of users (nSTS_Total);

and a VHT LTF (VHTLTF) field which transmits a number of LTF symbols (nLTF) determined by at least one of nSTS and nSTS_Total using a P matrix dimension of:

nSTS_Total×maximum nLTF symbols(nLTF_High).

4. The method of claim 3, wherein a non-zero value is added to the MU nSTS subfield.

5. The method of claim 3, wherein nSTS_Total_High−nSTS_Total is no greater than four.

6. The method of claim 3, wherein when there is less than three users, a user MU nSTS subfield is set to four and a dummy user MU nSTS subfield is set to:

nSTS_Total_High−nSTS_Total−4.

7. The method of claim 1, wherein the packet has a High Efficiency (HE) MU Orthogonal-Frequency Division Multiple Access (OFDMA) (HE-MU OFDMA) packet format that includes:

an LSIG field in which an L_Length subfield is set by adding a duration of the LTF symbols to a TXTIME vector of a PLME subfield with m=1;

HE Signal-A (HESIGA) fields in which:

bits B8 to B10 of HESIGA2 correspond to a number of HE LTF (HELTF) symbols and are set to nLTF_High;

bits B18 to B21 of HESIGA1 correspond to a number of HE Signal-B (HESIGB) symbols for the dummy user;

bit B22 of HESIGA1 corresponds to an HESIGB compressed mode subfield and is set to zero;

an HESIGB Common field in which a Resource Unit (RU) Allocation subfield is set to a bandwidth RU allocation as per a signal bandwidth of transmission indicating the dummy user;

an HESIGB User specific field where a dummy user subfield is added in which:

bits B0 to B10 correspond to a STA-ID subfield and are set to the STA-ID value of the dummy user;

bits B11 to B13 correspond to an nSTS subfield and are set to:

a maximum number of space time streams (nSTS_High)−nSTS_Total;

bits B14 to B20 are set to a desired value; and an HELTF field which transmits nLTF_High number of HELTFs using a P matrix dimension of:

nSTS_Total×nLTF_High.

8. The method of claim 1, wherein the packet has an HE-MU non-OFDMA packet format that includes:

an LSIG field in which an L_Length subfield is set by adding a duration of the LTF symbols to a TXTIME vector of a PLME subfield with m=1;

HESIGA fields in which:

bits B18 to B21 of HESIGA1 correspond to a number of MU Multiple-Input Multiple-Output (MIMO) and are set to nUser+d;

bit B22 of HESIGA1 corresponds to an HESIGB compressed mode subfield and is set to one;

an HESIGB User specific field where a dummy user subfield is added in which:

bits B0 to B10 correspond to a STA-ID subfield and are set to the STA-ID value of the dummy user;

bits B11 to B14 correspond to a spatial configuration subfield;

bits B15 to B20 are set to a desired value; and an HELTF field which transmits nLTF_High number of HELTFs using a P matrix dimension of:

nSTS_Total×nLTF_High.

9. The method of claim 8, wherein the spatial configuration subfield of the HESIGB User specific field is set according to an 802.11ax communications protocol.

10. The method of claim 8, wherein "d" of nUser+d is a non-zero value that indicates nSTS_Total_High as a total number of streams in the packet.

11. The method of claim 1, wherein the packet has an Extremely High Throughput (EHT) MU OFDMA (EHT-MU OFDMA) packet format that includes:

an LSIG field in which an L_Length subfield is set by adding a duration of the LTF symbols to a TXTIME parameter;

a Compressed Mode subfield included in at least one of a Universal Signal (USIG) field and an EHT Signal (EHTSIG) field that indicates an Uncompressed mode;

a number of LTFs present set to nLTF_High in at least one of the USIG field and the EHTSIG field;

a number of EHTSIG symbols set using the dummy user;

an RU Allocation subfield included in the EHTSIG field that is set to a bandwidth RU allocation that indicates the dummy user;

a dummy user subfield included at the end of the EHTSIG field in which:
  a STA-ID is set to the STA-ID value of the dummy user;
  an nSTS value is set to:

nSTS_Total_High−nSTS_Total, which indicates nSTS_Total_High as a total number of streams in the packet; and
an EHT LTF (EHTLTF) field which transmits nLTF_High number of EHTLTFs using a P matrix dimension of:

nSTS_Total×nLTF_High.

12. The method of claim 1, wherein the packet has an EHT-MU non-OFDMA packet format that includes:
  an LSIG field in which an L_Length subfield is set by adding a duration of the LTF symbols to a TXTIME parameter;
  a Compressed Mode subfield included in at least one of a USIG field and an EHTSIG field that indicates a Compressed mode;
  a dummy user subfield included at the end of the EHTSIG field; and
  an EHTLTF field which transmits nLTF_High number of EHTLTFs using a P matrix dimension of:

nSTS_Total×nLTF_High.

13. The method of claim 12, wherein for the dummy user, a total number of streams in the packet is nSTS_Total_High and corresponds to nLTF_High.

14. A wireless device, the wireless device comprising:
  a processor configured to:
  generate a multi-user (MU) Multiple-Input Multiple-Output (MIMO) packet for transmission to a user, wherein generation of the packet includes:
    encoding user signaling parameters and setting a station-identification (STA-ID) of the user to a value, wherein the signaling parameters include a number of space time streams (nSTS) spatial streams;
    establishing a dummy user without changing the user signaling parameters;
    setting a STA-ID of the dummy user to a value that is different from the STA-ID value of the user;
    indicating the nSTS spatial streams that are allocated to the dummy user and that are to include Long Training Field (LTF) symbols; and
  transmit the packet to the user with the LTF symbols, wherein the nSTS spatial streams that are allocated to the dummy user is selected to increase a number of LTF symbols in the packet to a maximum number defined by a packet format, wherein no power is allocated for transmission of data in a data portion of the packet to the dummy user, and wherein the nSTS spatial streams allocated to the dummy user cause a receiver of the packet to include the nSTS spatial streams in a sum of nSTS spatial streams indicative of the maximum number of LTF symbols.

15. The wireless device of claim 14, wherein the packet has a Very High Throughput (VHT) multi-user (MU) (VHT-MU) packet format that includes:
  a Legacy Signal (LSIG) field in which a length (L_Length) subfield is set by adding a duration of the LTF symbols to a transmission time (TXTIME) vector of a Physical Layer Management Entity (PLME) subfield;
  a VHT Signal-A (VHTSIGA) field in which a Group-ID subfield is set to a value other than at least one of zero and sixty-three to indicate the VHT-MU packet format, and in which an MU nSTS subfield is set to:
    sum of nSTS for a maximum number of users (nSTS_Total_High)−sum of nSTS for an actual number of users (nSTS_Total);
  and
  a VHT LTF (VHTLTF) field which transmits a number of LTF symbols (nLTF) determined by at least one of nSTS and nSTS_Total using a P matrix dimension of:

nSTS_Total×maximum nLTF symbols(nLTF_High).

16. The wireless device of claim 14, wherein the packet has a High Efficiency (HE) MU Orthogonal-Frequency Division Multiple Access (OFDMA) (HE-MU OFDMA) packet format that includes:
  an LSIG field in which an L_Length subfield is set by adding a duration of the LTF symbols to a TXTIME vector of a PLME subfield with m=1;
  HE Signal-A (HESIGA) fields in which:
    bits B8 to B10 of HESIGA2 correspond to a number of HE LTF (HELTF) symbols and are set to nLTF_High;
    bits B18 to B21 of HESIGA1 correspond to a number of HE Signal-B (HESIGB) symbols for the dummy user;
    bit B22 of HESIGA1 corresponds to an HESIGB compressed mode subfield and is set to zero;
  an HESIGB Common field in which a Resource Unit (RU) Allocation subfield is set to a bandwidth RU allocation as per a signal bandwidth of transmission indicating the dummy user;
  an HESIGB User specific field where a dummy user subfield is added in which:
    bits B0 to B10 correspond to a STA-ID subfield and are set to the STA-ID value of the dummy user;
    bits B11 to B13 correspond to an nSTS subfield and are set to:
      a maximum number of space time streams (nSTS_High)−nSTS_Total;
    bits B14 to B20 are set to a desired value; and
  an HELTF field which transmits nLTF_High number of HELTFs using a P matrix dimension of:

nSTS_Total×nLTF_High.

17. The wireless device of claim 14, wherein the packet has an HE-MU non-OFDMA packet format that includes:
  an LSIG field in which an L_Length subfield is set by adding a duration of the LTF symbols to a TXTIME vector of a PLME subfield with m=1;
  HESIGA fields in which:
    bits B18 to B21 of HESIGA1 correspond to a number of MU Multiple-Input Multiple-Output (MIMO) and are set to nUser+d;
    bit B22 of HESIGA1 corresponds to an HESIGB compressed mode subfield and is set to one;
  an HESIGB User specific field where a dummy user subfield is added in which:
    bits B0 to B10 correspond to a STA-ID subfield and are set to the STA-ID value of the dummy user;
    bits B11 to B14 correspond to a spatial configuration subfield;
    bits B15 to B20 are set to a desired value; and
  an HELTF field which transmits nLTF_High number of HELTFs using a P matrix dimension of:

nSTS_Total×nLTF_High.

18. The wireless device of claim 14, wherein the packet has an Extremely High Throughput (EHT) MU OFDMA (EHT-MU OFDMA) packet format that includes:
- an LSIG field in which an L_Length subfield is set by adding a duration of the LTF symbols to a TXTIME parameter;
- a Compressed Mode subfield included in at least one of a Universal Signal (USIG) field and an EHT Signal (EHTSIG) field that indicates an Uncompressed mode;
- a number of LTFs present set to nLTF_High in at least one of the USIG field and the EHTSIG field;
- a number of EHTSIG symbols set using the dummy user;
- an RU Allocation subfield included in the EHTSIG field that is set to a bandwidth RU allocation that indicates the dummy user;
- a dummy user subfield included at the end of the EHTSIG field in which:
  - a STA-ID is set to the STA-ID value of the dummy user;
  - an nSTS value is set to:

$nSTS\_Total\_High - nSTS\_Total,$ which indicates nSTS_Total_High as a total number of streams in the packet; and
- an EHT LTF (EHTLTF) field which transmits nLTF_High number of EHTLTFs using a P matrix dimension of:

$nSTS\_Total \times nLTF\_High.$

19. The wireless device of claim 14, wherein the packet has an EHT-MU non-OFDMA packet format that includes:
- an LSIG field in which an L_Length subfield is set by adding a duration of the LTF symbols to a TXTIME parameter;
- a Compressed Mode subfield included in at least one of a USIG field and an EHTSIG field that indicates a Compressed mode;
- a dummy user subfield included at the end of the EHTSIG field; and
- an EHTLTF field which transmits nLTF_High number of EHTLTFs using a P matrix dimension of:

$nSTS\_Total \times nLTF\_High.$

20. The method of claim 1, wherein the packet has one of a Very High Throughput (VHT) multi-user (MU) (VHT-MU) packet, a High Efficiency (HE) MU Orthogonal-Frequency Division Multiple Access (OFDMA) (HE-MU OFDMA) packet format, an HE-MU non-OFDMA packet format, an Extremely High Throughput (EHT) MU OFDMA (EHT-MU OFDMA) packet format, and an EHT-MU non-OFDMA packet format.

21. The wireless device of claim 14, wherein the packet has one of a Very High Throughput (VHT) multi-user (MU) (VHT-MU) packet, a High Efficiency (HE) MU Orthogonal-Frequency Division Multiple Access (OFDMA) (HE-MU OFDMA) packet format, an HE-MU non-OFDMA packet format, an Extremely High Throughput (EHT) MU OFDMA (EHT-MU OFDMA) packet format, and an EHT-MU non-OFDMA packet format.

\* \* \* \* \*